Oct. 31, 1950     B. H. IVES     2,527,818
TAIL GATE LIFT FOR TRUCKS
Filed Sept. 9, 1948     2 Sheets-Sheet 1
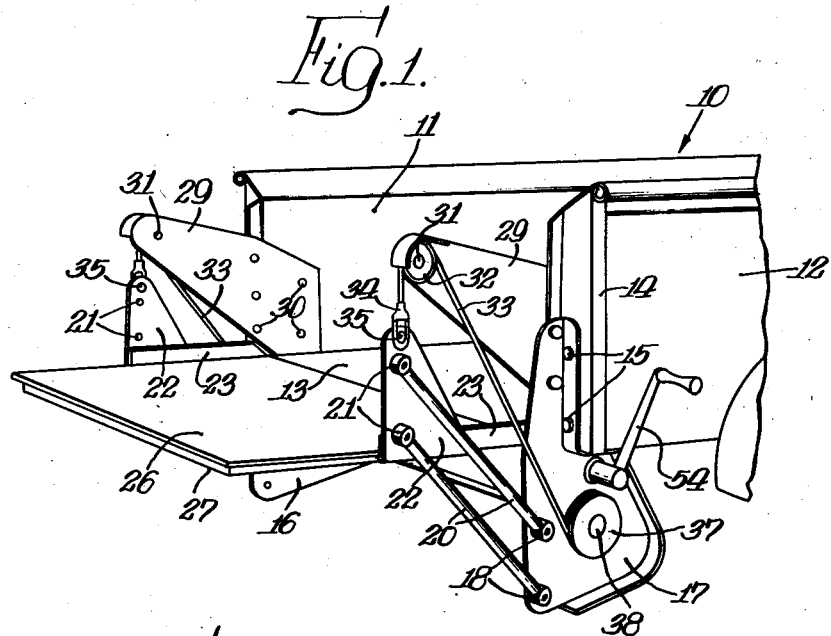
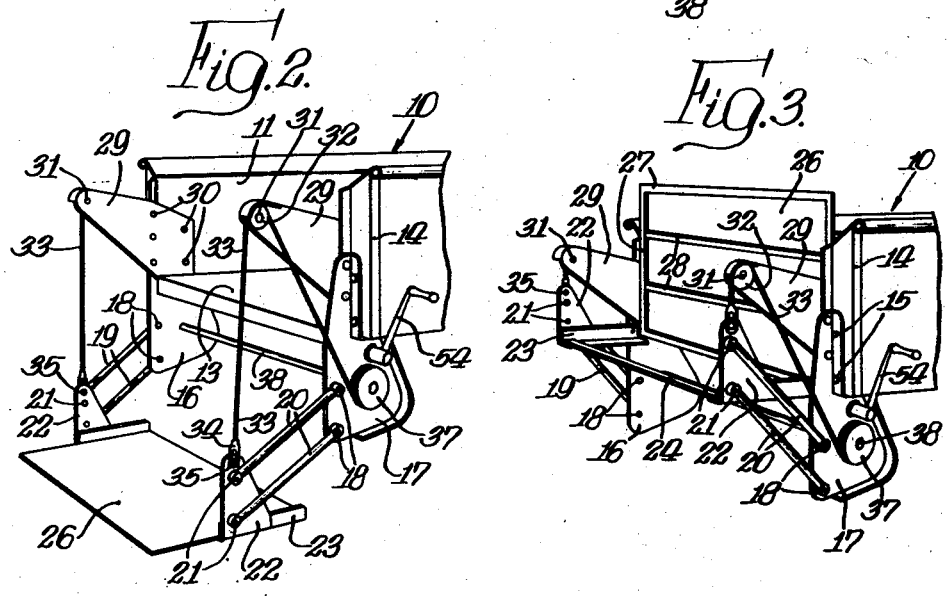
INVENTOR.
Burton H. Ives,
BY John P. Smith
Atty.

Oct. 31, 1950     B. H. IVES     2,527,818
TAIL GATE LIFT FOR TRUCKS
Filed Sept. 9, 1948     2 Sheets-Sheet 2
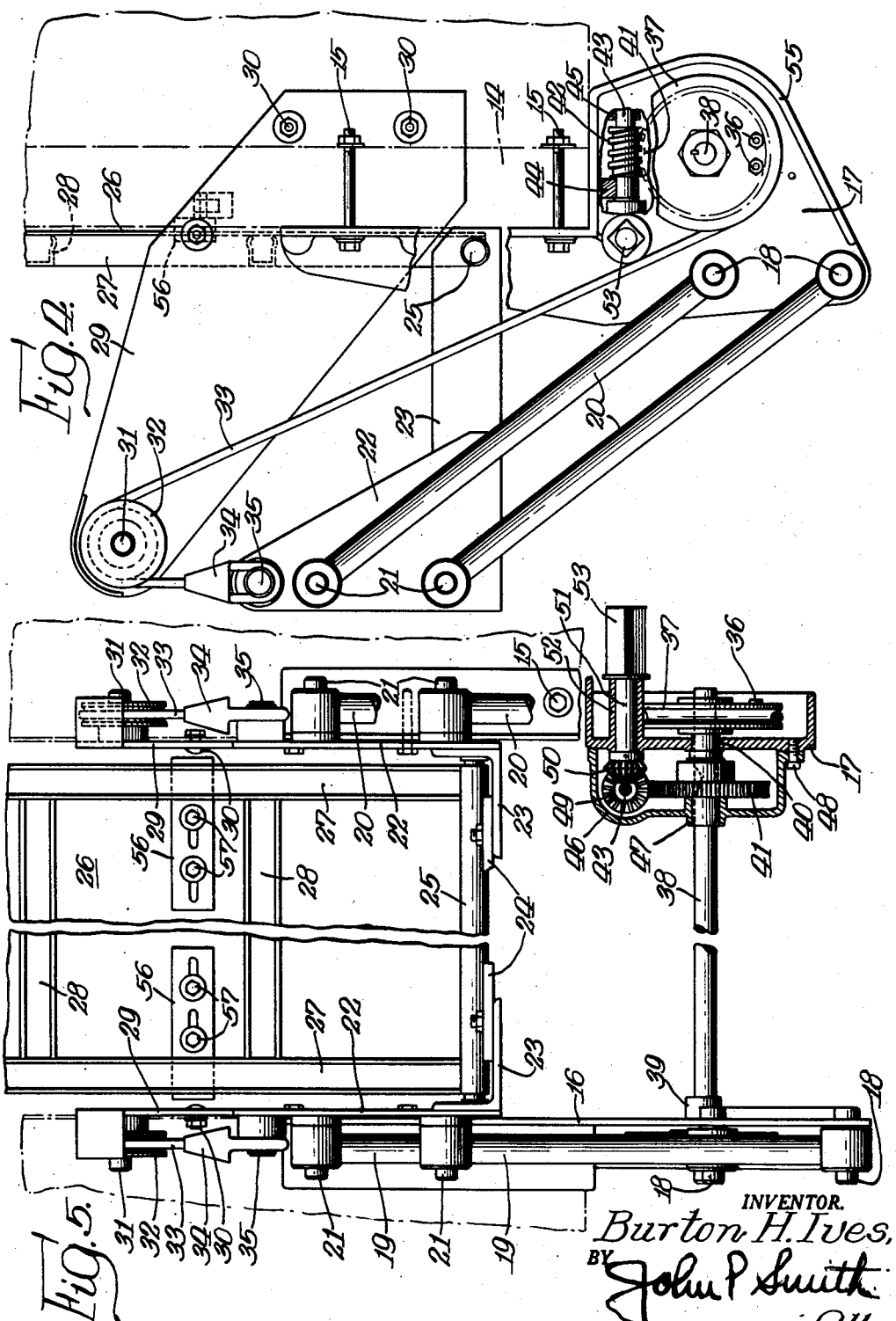
INVENTOR.
Burton H. Ives,
BY John P Smith
Atty.

Patented Oct. 31, 1950

2,527,818

UNITED STATES PATENT OFFICE 2,527,818

TAIL GATE LIFT FOR TRUCKS

Burton H. Ives, De Kalb, Ill.

Application September 9, 1948, Serial No. 48,442

3 Claims. (Cl. 214—77)

1

The present invention relates generally to a tail gate elevator or lift for trucks, but more particularly to a novel, improved and simplified construction of an elevator platform and tail gate which is particularly adapted to be attached to and supported on the rear end of automobile trucks for raising and lowering heavy packages, crates and the like to the elevation of the bed of the automobile truck or lower the same to the ground.

One of the primary objects of the present invention is to provide a novel, simple and easily operated elevated pick-up platform and tail gate for automobile trucks which can be easily manipulated by an operating hand crank on one side thereof.

A further object of the invention is to provide a novel and improved pick-up tail gate which is adapted to be attached to the rear portion of a truck by means of a parallel link arrangement for maintaining the lifting platform at a horizontal position throughout its operation.

These and other objects are accomplished by providing a construction and an arrangement of the various parts in the manner hereinafter described and particularly pointed out in the appended claims.

Referring to the drawings:

Fig. 1 is a fragmentary perspective view of the rear portion of an automobile truck to which my improved tail gate lift is attached and shown in raised position;

Fig. 2 is a similar perspective view showing the tail gate lift or platform in its lowermost position;

Fig. 3 is a similar perspective view showing the platform raised with the tail gate in a vertical or closed position;

Fig. 4 is an enlarged fragmentary side elevational view with certain parts broken away and other parts shown in section for the purpose of clearness; and Fig. 5 is a similar enlarged fragmentary and partially sectional rear elevational view of the parts shown in Fig. 4.

In illustrating one application of my invention, I have shown the same in connection with a box-like type of automobile truck, a fragmentary portion of which is shown in the drawings and generally indicated by the reference character 10. The truck body in this instance comprises the usual longitudinal sides 11 and 12 and bottom or bed 13 with the rear end of the truck body opened, as clearly shown in Figs. 1 and 2 of the drawings. Secured to the rear ends of

2 the opposite sides 11 and 12 of the body 10 are vertical posts 14 to which is attached by means of bolts 15 vertically depending and oppositely disposed brackets 16 and 17. Pivoted to the opposite brackets 16 and 17, as shown at 18, are oppositely disposed pairs of parallel links 19 and 20. The rear ends of each of these links are pivotally connected, as shown at 21, to oppositely disposed triangular plates 22. These plates 22, in turn, are secured to oppositely positioned and rearwardly extending horizontal angle members 23. The rear ends of these angle members 23 are secured together by transverse spacer bar 24. The angle members 23, together with the spacer bar 24, constitute the platform support for the pivoted platform or tail gate hereinafter described. Pivoted adjacent the forward ends of the opposite angle members 23, as shown at 25, is a platform or tail gate 26. The rear or bottom side of this tail gate 26 is provided with reinforced frame structure about the periphery, as shown at 27, and transverse reinforced members 28. When the tail gate 26 is in its horizontal position, as shown in Figs. 1 and 2 of the drawings, it serves as a lifting platform and when in its vertical position, as shown in Figs. 3, 4 and 5 of the drawings, forms the tail gate for the truck body 10. Secured to the inner surfaces of the opposite side walls 11 and 12 of the truck body 10, are upwardly and rearwardly extending triangular plates 29. These plates 29 are secured to the respective side walls of the truck body by bolts 30. Journaled adjacent the upper ends of these plates 29 directly over the center of the platform 26, on suitable pins 31, are sheaves or pulleys 32. Trained about these opposite pulleys 32 are cables 33. The rear ends of each of these cables 33 are provided with loop-like connections 34, which engage the bolts 35. The bolts 35 are secured adjacent the upper ends of the opposite plates 22. The other ends of the cables 33 are connected by suitable clips, which in turn, are secured to transverse bolts 36 carried by the opposite pulleys or drums 37. The pulleys or drums 37 are secured to a transverse shaft 38. The shaft 38 is journaled in opposite bearings 39 and 40 formed in the opposite respective plates 16 and 17. Secured to the shaft 38 adjacent the inner side of the plate 17 is a worm-wheel 41. The worm-wheel meshes with and is operatively driven by a worm 42. The worm 42 is secured to a shaft 43. The opposite ends of the shaft 43 are journaled in bearing portions 44 and 45 formed in a gear housing 46. The gear housing 46 has a centrally located bearing portion 47 in which the shaft 38 is journaled. The gear housing 46 is secured to the inside of the plate 17 by suitable spaced apart bolts 48. Secured to the rear end of the worm-shaft 43 is a beveled pinion 49 which meshes with and is operatively driven by a second beveled pinion 50. The beveled pinion 50 is secured to the inner end of a stub shaft 51 which is journaled in a bearing barrel 52 formed integrally with the bracket 17. The outer end of the shaft 52 is provided with a square shank 53 on which a removable crank operating handle 54 may be mounted for operatively raising and lowering the tail gate or platform lift. Each of the plates 16 and 17 are provided with peripheral flanges, as shown at 55, to form shields which substantially surround the opposite cables and pulleys carried by the brackets 16 and 17. Suitable transverse and oppositely disposed locks in the form of slotted flat steel bars may be slidably mounted on the bottom or rear side of the gate 26 by means of bolts 57 for locking the gate in vertical position to the vertical walls 11 and 12 of the truck body 10, as shown in Fig. 5 of the drawings.

Summarizing the advantages and functions of operation of my improved platform lift and tail gate, it will be obvious that the same may be readily mounted on the rear end of a truck body by merely securing the opposite brackets 16 and 17 and plates 29 to the rear ends of the vertical side walls 11 and 12 of the truck body. When an operator desires to lift a package, crate or the like from the ground position to the elevated position in line with the bed 13 of the truck, the crank handle 54 is manipulated and through the operation of the beveled pinions 50, 49, worm 42 and worm gear 41, the pulleys or drums 37 are revolved to wind the cables 33 thereon. This operation, through the parallel link arrangement 19 and 20, raises the platform 26 from the position shown in Fig. 2 of the drawings, to the position shown in Fig. 1 of the drawings. By reason of the worm and worm gear construction, the platform may be maintained at any elevation without a lock.

When the load is removed from the platform 26 it may be swung upwardly to its vertical position to form an end gate as shown in Figs. 3, 4 and 5 of the drawings.

While in the above specification I have described one embodiment which my invention may assume in practice, it will, of course, be understood that the same is capable of modification and such modification may be made without departing from the spirit and scope of the invention as expressed in the following claims.

What I claim as my invention and desire to secure by Letters Patent is:

1. A platform lift for a truck comprising depending brackets secured to the opposite sides and rear ends of a truck body, a platform support, parallel links connecting said support to said brackets, rearwardly and upwardly extending plates secured to the opposite sides of said truck body, pulleys journaled on said plates directly over the center sides of said platform, a transverse shaft positioned below said truck body and journaled in said brackets, pulleys secured adjacent the opposite ends of said shaft, cables trained about said first named pulleys and one of their ends secured to the center portion of each of the sides of said platform support, the other ends of said cables secured to said second named pulleys, a worm gear secured to said shaft, a worm carried by one of said brackets and meshing with said gear, a bevel pinion secured to said worm, a stub shaft carried by one of said brackets, a second bevelled pinion secured to said stub shaft and meshing with said first named pinion, and a tool engaging shank formed on one end of said stub shaft for the reception of a manually operable handle for raising and lowering said platform.

2. A platform lift for a truck comprising depending brackets secured to the opposite sides and rear ends of a truck body, a platform support, parallel links connecting said support to said brackets, rearwardly and upwardly extending plates secured to the opposite sides of said truck body, pulleys journaled on said plates directly over the center sides of said platform, a transverse shaft positioned below said truck body and journaled in said brackets, pulleys secured adjacent the opposite ends of said shaft, cables trained about said first named pulleys and one of their ends secured to the center portion of each of the sides of said platform support, the other ends of said cables secured to said second named pulleys, a worm gear secured to said shaft, a worm carried by one of said brackets and meshing with said gear, a beveled pinion secured to said worm, a stub shaft carried by one of said brackets, a second bevelled pinion secured to said stub shaft and meshing with said first named pinion, and means formed on one end of said stub shaft for engagement with a crank handle for manually raising and lowering said platform.

3. A platform lift for an automobile truck comprising oppositely disposed depending brackets secured to the opposite sides of said truck, horizontally spaced apart pairs of parallel links pivoted at their forward end to said brackets, a platform support pivoted at the rearward end of said links, plates secured to the opposite sides of said truck and overhanging said platform support, a platform pivoted on said support, pulleys journaled on said plates substantially over the center side portions of said platform, cables having one of their ends secured to the opposite side and in the center of said support, said cables being trained about said pulleys, a horizontal shaft journaled in said brackets, pulleys secured to said shaft outside said brackets, the other ends of said cables being secured to said last named pulleys, a worm and worm gear mechanism carried by one of said brackets and operatively related to said shaft, and a manually operable crank operatively related to said worm and worm gear mechanism for raising and lowering said platform.

BURTON H. IVES.

REFERENCES CITED

The following references are of record in the file of this patent:

UNITED STATES PATENTS

| Number | Name | Date |
| --- | --- | --- |
| 2,088,648 | Hansen | Aug. 3, 1937 |
| 2,194,403 | Novotney | Mar. 19, 1940 |
| 2,203,310 | Shonnard | June 4, 1940 |

FOREIGN PATENTS

| Number | Country | Date |
| --- | --- | --- |
| 451,704 | Germany | Oct. 13, 1927 |